United States Patent [19]
Yamamoto et al.

[11] Patent Number: 5,137,213
[45] Date of Patent: Aug. 11, 1992

[54] HEATER UNIT FOR THE AUTOMOBILE AIR CONDITIONER

[75] Inventors: Akihiko Yamamoto; Naoharu Shibuya, both of Yokohama; Eiji Takahashi; Hitoshi Akasaka, both of Tokyo, all of Japan

[73] Assignees: Nissan Motor Co., Ltd., Yokohama; Calsonic Corporation, Tokyo, both of Japan

[21] Appl. No.: 457,357

[22] Filed: Dec. 27, 1989

[30] Foreign Application Priority Data

Dec. 28, 1988 [JP] Japan .................................. 63-331066

[51] Int. Cl.⁵ .......................................... G05D 23/00
[52] U.S. Cl. ..................................... 237/2 A; 165/39
[58] Field of Search ............. 237/2 A, 12.3 A, 12.3 B; 236/91 F; 165/39

[56] References Cited
FOREIGN PATENT DOCUMENTS
312224 6/1987 Japan .

Primary Examiner—Henry A. Bennet
Attorney, Agent, or Firm—Gordon W. Hueschen

[57] ABSTRACT

The present invention relates to a heater unit for the automobile air conditioner. The heater unit comprises a sensor group consisting of a plurality of sensors, mode selecting means for selecting one from at least two D/F modes above-mentioned, and control means for obtaining "target blowout tempeature (Tm)" based on input data from said sensor group and for selecting one out of said two D/F modes in which the rate of air through said foot outlet is greater, in the case where ambient air temperature taken by said sensor group is lower than the specified point corresponding thereto. In virtue of this, it contributed to improving air heating performance with window clouding prevented, in accordance with in- and out-car conditions.

3 Claims, 4 Drawing Sheets

HEATER UNIT FOR THE AUTOMOBILE AIR CONDITIONER

BACKGROUND OF THE INVENTION

1. Field of the Invention

The present invention relates to a heater unit for automobile air conditioner and more particularly improvement in prevention of window and air heating performance in DEF/foot mode operation of automatic air conditioner.

2. Description of the Prior Art

In recent years, for the purpose of the improvement in safe driving, automatic air conditioner has become used popularly for the automobile. In virtue of this system, only if a driver sets a desired temperature, then the temperature of the conditioned air, ON/OFF of compressor, selection appropriate one from outlet modes associated with control doors, intake of inside air and/;or outside air, and air amounts can be automatically controlled.

Automobile air conditioning is accomplished under the control of temperature and other parameters of it by a control unit where data signalled from different sensors particularly of in-car sensor, ambient sensor, intake sensor, sun sensor, and water temperature sensor located as predetermined is referred to respective previously-specified values.

"Automobile air conditioning system" can be operated in the so-called outlet modes in each of which some are selected from a plurality of outlets provided in the heater unit according to in-car and ambient conditions. There is known an automatic air conditioner of which an outlet mode having two different opening angles. For example, defrost/foot (referred to as D/F hereinafter) mode is subdivided into I and II in which their ratios between blows through defrost and foot outlets is set to 2:8 and 3:7, respectively. Such subdivision of D/F mode comes because of preventing window inside clouding in the case of low ambient air temperature, and thus making it possible to blow a relatively large amount of hot air against window surface even in the case of reduced blow-off because of lowering in fan speed under automatic control by the automatic air conditioner. The construction therefore is provided that when the "target blowout temperature (Tm)" obtained based on input data from the aforesaid sensors is high, D/F mode I is selected, and additionally if ambient air temperature is low, D/F mode II is selected to blow a large amount of hot air against window inside surface compared with D/F mode I.

The above-stated automobile air conditioner operable in two D/F modes may be certainly effective to prevent window clouding at low ambient air temperatures by selecting D/F mode II and blowing off a large amount of hot air from defrost duct. In this case or at low ambient air temperatures, generally, the inside of the car is at low temperature, and for this reason, a large amount of hot air should be also blown at the feet of the drier or passengers. The prior automatic air conditioner will select one from D/F modes I and II in one significance depending only upon ambient air temperature, resulting in a small amount of hot air supplied at the feet compared with D/F mode I. This may be said poor control in aspect of air heating.

The inventors therefore have studied with intense effort to develop a heater unit for automobile air conditioner having satisfactory preventive effect on window clouding can achieved without needing to exceed a certain amount of hot air, and for another thing the amount of air fed by a fan is controlled depending on the "target blowout temperature", and as a result the present invention has been completed.

SUMMARY OF THE INVENTION

In view of the above-mentioned problems involving the prior art, the present invention has been accomplished. It is an object of the present invention to provide a heater unit for automobile air conditioner contributing to improvement in air heating performance as well as sufficient effect to prevent window clouding.

The above-stated object has been achieved according to the invention which is a heater unit for the automobile air conditioner so constructed that after mixing air passing through the heater core provided in the heater unit housing with air bypassing into, the thus-conditioned air is blown it the car room through some selected from a plurality of outlets including at least defrost outlet and foot outlet, and in which of two D/F modes of which distribution ratios between air amounts through both outlets are different from each other, comprising.

A sensor group consisting of a plurality of sensors, mode selecting means for selecting one from at least two D/F modes above-mentioned, and control means for obtaining a "target blowout temperature (Tm)" based on input data from the sensor group and for selecting one out of the D/F modes in which the rate of air through the foot outlet is greater than that of the other in the case where ambient air temperature taken by the sensor group is lower than the correspondent specified point and the "target blowout temperature (Tm)" is higher than the correspondent specified point.

The present invention having such construction permits in the case where the D/F mode associated with the "target blowout temperature (Tm)" obtained by the control means is selected, that if the ambient air temperature taken by the sensors is lower than the correspondent specified point, on out of the D/F modes in which the rate of air amount through defrost outlet is increased is selected whereas if the "target blowout temperature (Tm)" is higher than the correspondent specified point, the other out of the D/F modes in which the rate of air amount through defrost outlet is reduced and the rate of air amount through foot outlet is increased is selected, thereby an appropriate amount of hot air is discharged through the defrost outlet and sufficient amount of hot air is supplied near driver's passengers' feet.

DETAILED DESCRIPTION OF THE PREFERRED EMBODIMENT

Figure 1:
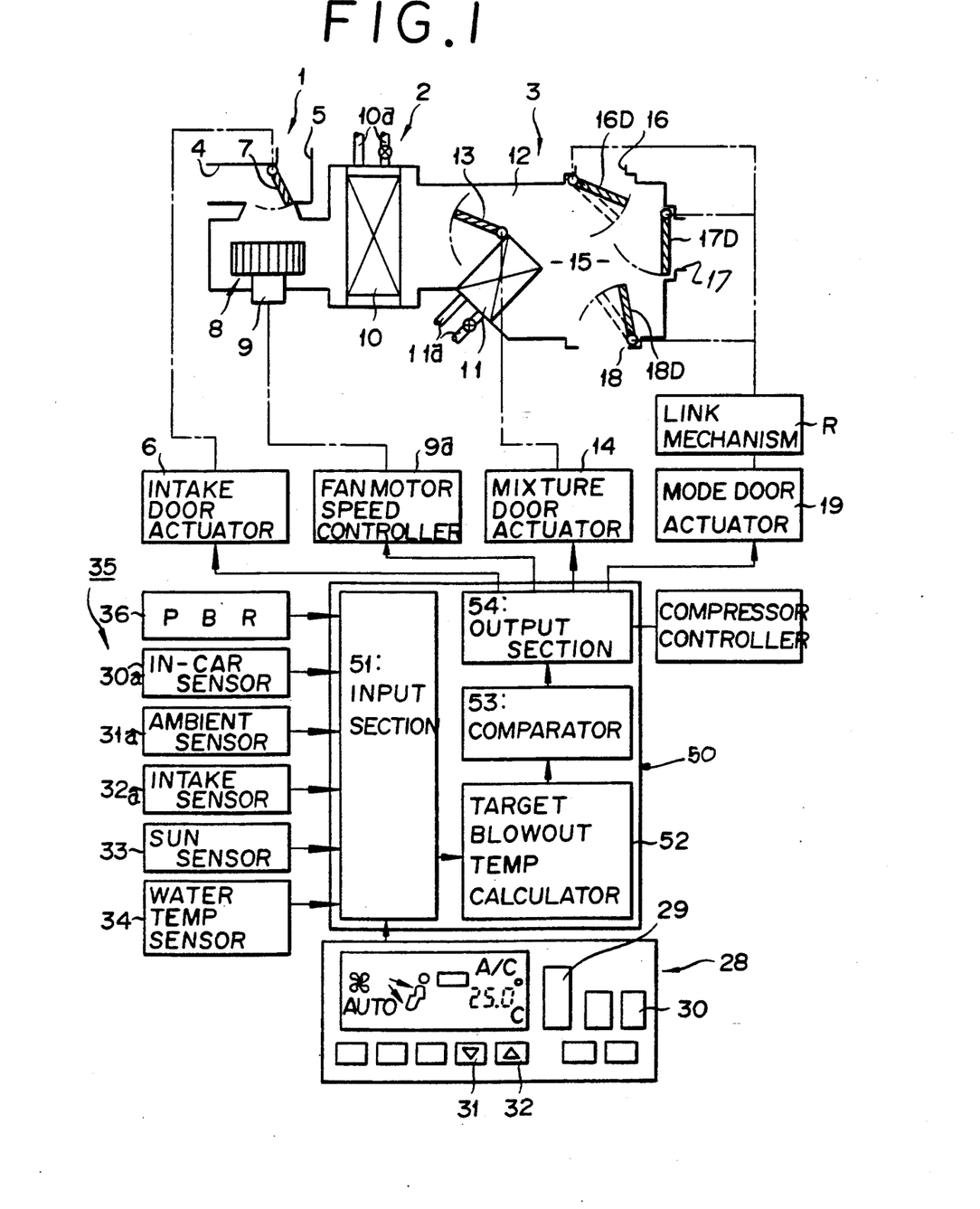
FIG. 1 is a schematic illustration of an automobile air conditioner including a heater unit embodying the present invention together with a block diagram of the associated constructive components.

In the following will be described with reference to the drawings an automatic air conditioner according to the invention which is composed of three sections of an intake unit 1, a cooling unit 2, and a heater unit 3. The intake unit 1 includes intakes 4, 5 for airs inside and outside the car, respectively, and the inflow ratio between both air is adjusted by an intake door 7 driven by an intake door actuator 6. The air inflow is caused by a fan 8 provided in the intake unit 1 and adjusted by changing the number of revolutions of a fan motor 9 which is controlled by means of a fan motor speed controller 9a.

The cooling unit 2 is provided therein with an evaporator 10 of which refrigerant pipes 10a are connected to the cooling cycle (not shown). In this unit, the taken-in air is cooled through heat exchange.

The heater unit 3 includes a heater core 11 to which hot water pipes 11a a are connected. Through the water pipes, engine cooling water is circulated. There is found in close vicinity of the heater core 11 a bypass 12 through which the taken-in air flows so as to bypass the heater core 11. Upstream of the heater core 11 is located an air mixture door 13 which can be caused by a mixture door actuator 14 to turn in the range of from the completely-closed and full-opened positions and thus by which the ratio between amounts of air passing through the heat core 11 and the bypass 12, respectively, is adjusted.

In addition, there is provided downstream of the heater core 11a mixture chamber 15 including a defrost outlet 16 through which hot air is blown toward the inside surface of the windshield, a vent outlet 17 through which the conditioned air is blown toward the upper half of the driver's body, and a foot outlet 18 through which hot air is blown toward the driver's or passengers' feet. These outlets 16, 17 and 18 are provided with turntable doors 16D, 17D and 18D for closing and opening them, respectively. These control doors: defrost door 16D, vent door 17D and foot door 18D are coupled to a link mechanism R, and set to desired opening angles each as the result of the turn of the link mechanism R caused by a mode door actuator 19. In detail, there are four modes: vent mode in which vent door 17D only is opened, bi-level mode (referred to as B/L mode hereinafter) in which vent door 17D and foot door 18D are set to half-opened position, defrost/foot mode (referred to as D/F mode hereinafter) in which defrost door 16D and foot door 18D are set to about half-opened and DEF mode in which defrost door 16D only is opened. In each of B/L and D/F modes divided into two submodes, respectively having different distribution ratios between outlet airs, respectively.

In other words, as illustrated in FIG. 1, D/F mode is divided into submodes D/F mode I (defrost door 16D and foot door 18D are positioned in the opening angle represented by solid lines, respectively) and D/F mode II (defrost door 16D and foot door 18D are positioned in the opening angles represented by dotted lines, respectively). The distribution ratios between air amounts through defrost outlet and foot outlet are set as follows:

| D/F mode I | 2:8 |
| --- | --- |
| D/F mode II | 3:7 |

Two submodes of which distribution ratios are different as mentioned above permit to prevent clouding on the inside surface of window at low ambient air temperature, and besides blow a large amount of hot air toward the inside surface of window even at low speeds of the fan 8 associated with a small amount of outlet air under automatic control of the automatic air conditioner. The distribution ratios mentioned above are not limited in the present invention. For example, the distribution ratio of D/F mode II may be 4:6.

An intake door actuator 6, a fan motor speed controller 9a, a mixture door actuator 14, and a mode door actuator 19 are under the control of the control means 50.

To "the main controller" 50 are connected a sensor group 35 including an in-car sensor 30 mounted, for instance, on the front of the instrument panel in the car, an ambient sensor 31 disposed near the radiator grille, an intake sensor 32, by which the temperature of air stream directly down stream of the evaporator 10, disposed near the connection between the cooling unit 2 and heater unit 3 is measured, a sun sensor 33 on the instrument panel, a water temperature sensor 34, by which engine cooling water temperature is taken, which is mounted in the warm water pipe 11a of the heater core 11, and a (PBR potentio-balance resistor) provided in the mixture door actuator 14. Thus, by said intake sensor 32 the temperature of air stream directly down stream of the evaporator 10 is measured, by said water temperature sensor 34 engine cooling water temperature is taken, and by said PBR 36 the opening angle of the air mixture door 13 is sensed. The data of these are inputted sensors to the input section 51 of the control means 50. Reference characters designate as follows: 52 a target blowout temperature calculating section for getting the target blowout temperature (Tm) 53 a comparator for comparing the "target blowout temperature (Tm)" with the present reference data, and 54 an output section for outputting the results obtained by the comparator 53 to intake door actuator 6, fan motor speed controller 9a, air mixture door actuator 14, and mode door actuator 19.

To the control means 50 are connected further a number of control switches on control panel 28 by means of which the present automobile air conditioner is controlled. The switches include such as a cut-off switch 29 for the automobile air conditioner, an automatic operation switch 30 for the air conditioner, and buttons 31 and 32 for inputting temperature to be set (referred to as set temperature hereinafter).

The target blowout temperature calculating section determines "target blowout temperature (Tm)" which refers to a set temperature and data taken by in-car sensor 30, ambient sensor 31 and sun sensor 33, and thus corresponds to the outlet air temperature required for bringing the actual in-car temperature to the set temperature within a specified time. The "target blowout temperature (Tm)" is determined with the following equation of the first degree: $Tm = (A+D)Tptc + BTam + C\cdot Qsun - DTinc + E$ wherein are defined as Tptc: set temperature, Tam: ambient air temperature, Qsun: sun radiation, and Tinc: in-car temperature. A, B, C, D and E are weights (corrective factors) of the parameters (set-temperature, ambient air temperature, sun radiation and in-car temperature) on the "target blowout temperature (Tm)".

In the present invention, the "target blowout temperature (Tm)" is not determined only upon the set temperature Tptc but beside depends on in-car temperature, ambient air temperature and sun radiation at that time, and therefore may be stated to be the outlet air temperature with respect to which all these parameters are considered as factor and at which the set temperature can be attained as soon as possible.

In an example of air heating, assuming at a set temperature Tptc of 25° C. inputted on the control panel and at in-car temperature Tinc of 10° and 20° C., respectively, then for attaining rapidly the set in-car temperature starting with the lower in-car temperature, a larger amount of a higher temperature hot air should be blown off and the "target blowout temperature (Tm)" should be higher. Sun radiation Qsun and ambient air temperature Tam may be set so: when the same set temperature is inputted, the smaller the sun radiation is and the ambient air temperature is lower, the higher the "target blowout temperature (Tm)" becomes lower.

On the other hand, air cooling is inverse to air heating. On assumption that a set temperature Tptc of 20° C. is inputted on the control panel and the in-car temperatures Tinc is of 35° and 25° C., respectively, then for attaining rapidly the set in-car temperature 20° C. starting with the higher in-car temperature, a larger amount of a lower temperature cool air should be blown off and the "target blowout temperature (Tm)" should be lower. Sun radiation Qsun and ambient air temperature Tam may be set so: "target blowout temperature (Tm)" becomes lower with more intense sun radiation and with higher outside air temperature.

The "target blowout temperature (Tm)" which is being calculated target blowout temperature calculating section 52 is being output to the comparator 53. Thus based on this "target blowout temperature (Tm)" and other information including set temperature, in-car temperature and other data are obtained the opening angle of the air mixture door, ON/OFF of the compressor, change of outlet mode, intake doors for inside and outside and air amounts to be adjusted.

Figure 2:
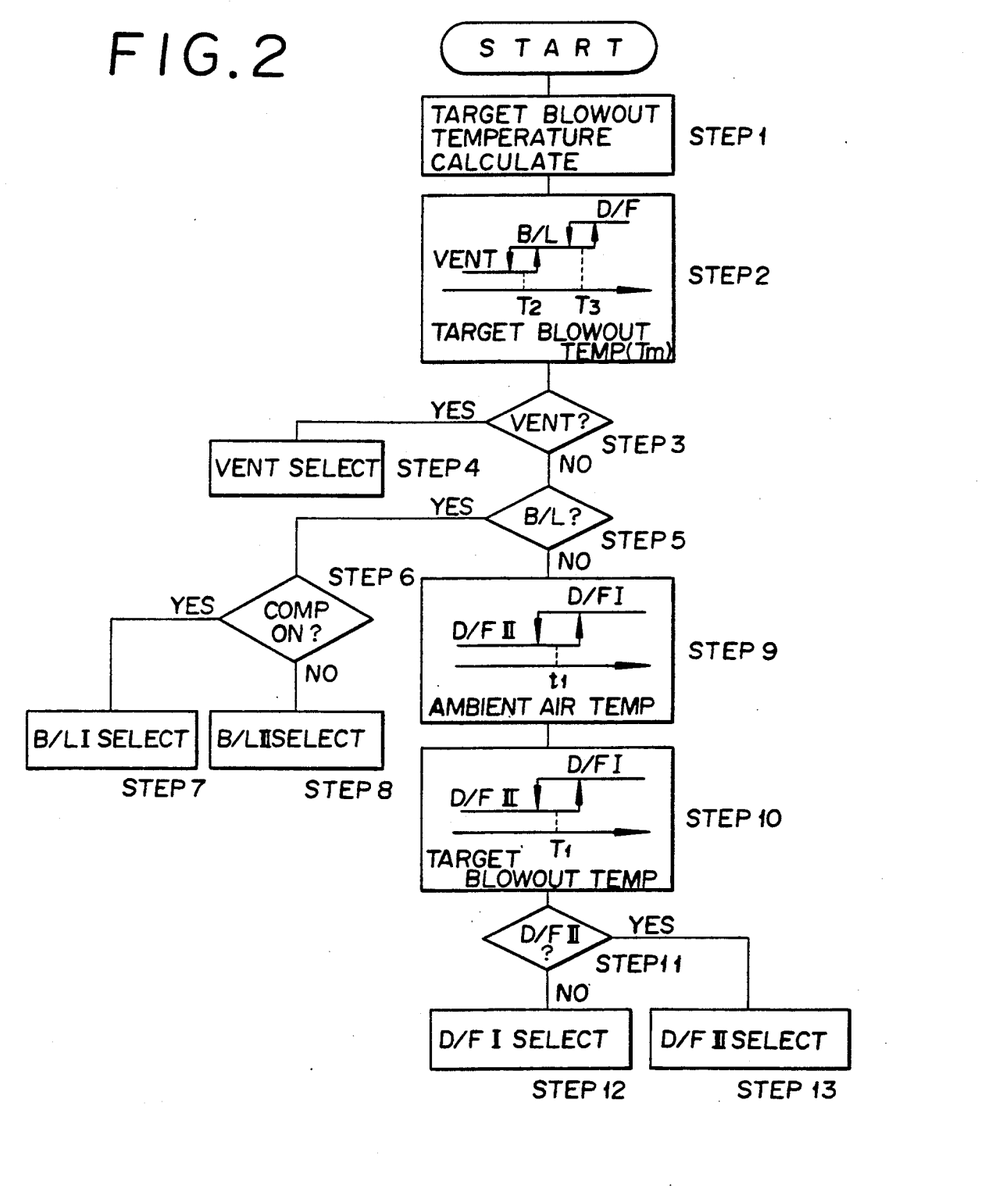
FIG. 2 depicts a flow chart illustrative of the main program of the same embodiment.

After data is inputted through the input section 51 from the sensor group 35 and controller 28 are obtained following in the flow chart shown in FIG. 2 sequentially: the opening angle of air mixture door, ON/OFF of the compressors, outlet mode, intake doors for inside and outside air, and air amounts.

Figure 4:
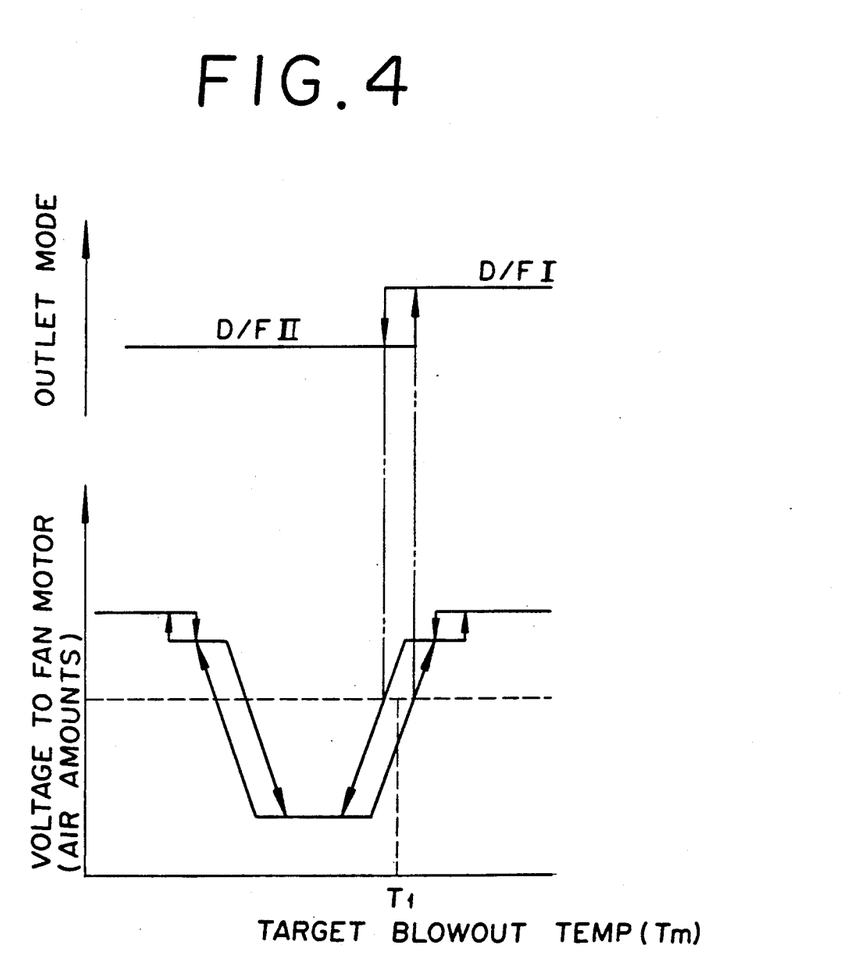
FIG. 4 is a graph representing the relationships of the applied voltage to the fan motor and the outlet mode, respectively, to the "target blowout temperature (Tm)."

The operation of the auto air conditioner embodying the present invention will be described with reference to FIGS. 2 and 4.

Steps 1 through 8

In FIG. 2, execution proceeds from "Start" to step 1 in which arithmetic operation is conducted based on data from a set temperature inputted to the controller and data transmitted from in-car sensor 30a, ambient sensor 31a, intake sensor 32a and sun sensor 33 to obtain a "target blowout temperature (Tm)". Execution proceeds to step 2 for the selection of outlet mode appropriate for the resultant "target blowout temperature (Tm)" in particular, if the "target blowout temperature (Tm)" is low than the specified temperature T2, the vent mode is selected (steps 3 and 4). If it is at intermediate level, T2 to T3 B/L level is selected (step 5), and execution proceeds to step 6 from which goes to step 7 of B/L mode II where the compressor remains in ON position.

The B/L modes I and II are different in distribution ratio between air amounts through vent outlet 17 and foot outlet 18.

Step 9 through 13

If the "target blowout temperature (Tm)" is higher than the specified temperature T3, execution proceeds to step 9. If an ambient air temperature "t" taken by the ambient sensor 31 is higher than the specified temperature "t1" (step 9) such as 0° C., D/F mode I is selected. If it is lower than −3° C., D/F mode II is selected. In the case where D/F mode II is selected in step 9, and assuming that a "target blowout temperature (Tm)" is higher than the specified temperature point T1 (FIG. 4), then the voltage applied to the fan motor becomes higher and in turn the fan air amount increases, whereby hot air amount blow off through the defrost outlet 16 increases, and as a result, D/F mode I is selected so that both requirements of preventing window clouding and providing good in-car air heating may be met(steps 10 to 13).

In this way, the heater unit according to the invention is constructed so that in the case of lower ambient air temperature, and correspondingly higher "target blowout temperature (Tm)", D/F mode I is selected to improve air heating performance with window clouding prevented; and that in the case where air heating is sufficiently provided to cause the "target blowout temperature (Tm)" to get lower, the change into D/F mode II occurs whereby adequate prevention against window clouding can be accomplished.

As described above, the heater unit for the automobile air conditioner in accordance with the invention comprises a plurality of sensors, means for selecting one from at least two D/F modes, and control means for determining a "target blowout temperature (Tm)" based on data inputted from the sensors, and for selecting from the two D/F modes one in which the rate of air through the foot outlet is higher in the case where an ambient air temperature taken by the sensors is lower than the specified temperature, and the "target blowout temperature (Tm)" is higher than the specified temperature; and in virtue of this, contributes to improving air heating performance with window clouding prevented, in accordance with in- and out-car conditions.

What is claimed is:

1. A heater unit for an automobile air conditioner, comprising:
    a heater unit housing including a heater core,
    means for passing air through said heater core,
    means for collecting air bypassing said heater core,
    means for mixing the air passing through said heater core with the air bypassing said heater core,
    a plurality of outlets including at least a defrost outlet and a foot outlet, a defrost door mounted in said defrost outlet and a foot door mounted in said foot outlet,
    means for blowing said mixed air into a car room through said defrost outlet and said foot outlet,
    said defrost outlet and said foot outlet being arranged to operate in one of two defrost/foot modes in which said defrost door and said foot door are set in the position in which they are each in about half-opened position, each of said defrost/foot modes having different distribution ratios between the amount of air passing through said defrost outlet and the amount of air passing through said foot outlet, said heater unit additionally comprising:

a sensor group including a plurality of sensors, mode-selecting means for selecting one of said two defrost/foot modes, control means for obtaining a target blowout temperature based on input data from said sensor group and for selecting one of said two defrost/foot modes in which the rate of air through said foot outlet is greater, in the case where ambient air temperature taken by said sensor group is lower than a specified temperature inputted beforehand and said target blowout temperature is higher than a specified temperature inputted beforehand.

2. A heater unit for an automobile air conditioner according to claim 4, wherein said sensor group includes an in-car sensor for taking in-car temperature, an ambient sensor for taking ambient air temperature, an intake sensor for taking air temperature downstream of the evaporator, and a sun sensor for measuring sun radiation.

3. A heater unit for an automobile air conditioner according to claims 1 or 2, wherein said mode-selecting means comprises a link mechanism coupled to said defrost door, a vent door, and said foot door, and having a mode-door actuator arranged for causing said link mechanism to turn.

* * * * *

UNITED STATES PATENT AND TRADEMARK OFFICE
CERTIFICATE OF CORRECTION

PATENT NO. : 5,137,213

DATED : Aug. 11, 1992

INVENTOR(S) : Akihiko Yamamoto, Naoharu Shibuya, Eiji Takahashi, Hitoshi Akasaka It is certified that error appears in the above-identified patent and that said Letters Patent is hereby corrected as shown below:

Title Page, 2nd Column, ABSTRACT, [57], line 6; "tempeature" should read -- temperature --.

Figure 3:
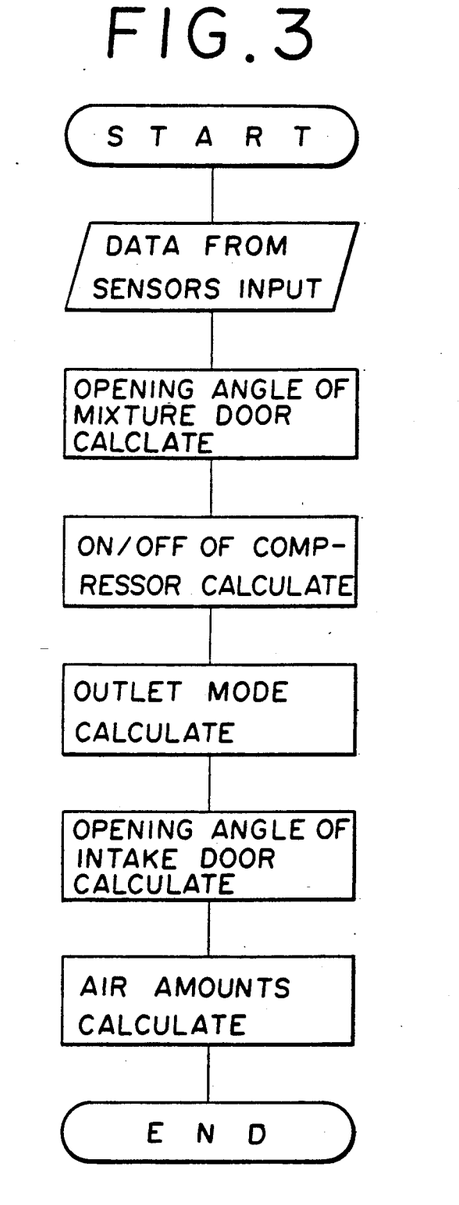
FIG. 3 is a flow chart illustrative of the calculations made in the operating process of the apparatus of the present invention.

Drawing Sheet 3, FIG. 3, 6th line; "CALCLATE" should read -- CALCULATE --.

Column 2, line 1; "clouding can achieved" should read -- clouding which can be achieved --.

Column 2, approximately line 19; "into," should read -- it, --.

Column 2, line 20; "blown it" should read --blown into--.

Column 2, line 25; "comprising." should read --comprising:--.

Column 2, line 41/42; "correspondent" should read -- corresponding --.

Column 2, line 42; "on" should read -- one --.

Column 2, approximately line 53; "driver's passengers'" should read -- driver's and passengers' --.

Column 3, approximately line 33; "11α " should read -- 11 a --.

Column 4, line 2; "3.-" should read -- 3.7 --.

Column 4, line 29; delete "warm".

Column 4, line 30; "(PBR potentio-balance resistor)" should read -- PBR (potentio-balance resistor) --.

Column 4, line 55; "section" should read -- section 52 --.

Column 4, line 56; "determines target" should read -- determines a target --.

UNITED STATES PATENT AND TRADEMARK OFFICE
CERTIFICATE OF CORRECTION

PATENT NO. : 5,137,213

DATED : Aug. 11, 1992

INVENTOR(S) : Akihiko Yamamoto, Naoharu Shibuya, Eiji Takahashi, Hitoshi Akasaka It is certified that error appears in the above-identified patent and that said Letters Patent is hereby corrected as shown below:

Column 5, line 64; "low" should read -- lower --.
Column 6, line 14; "temperature point T1 should read -- temperature T1 --.
Column 5, lines 65/66; "intermediate level, T2" should read -- intermediate level, from T2 --.

Signed and Sealed this

Fourteenth Day of December, 1993

Attest:

BRUCE LEHMAN

Attesting Officer

Commissioner of Patents and Trademarks